United States Patent [19]

Okino

[11] 4,306,281
[45] Dec. 15, 1981

[54] DC-DC CONVERTER FOR ELECTRONIC FLASH UNIT

[75] Inventor: Tadashi Okino, Yokohama, Japan

[73] Assignee: Canon Kabushiki Kaisha, Tokyo, Japan

[21] Appl. No.: 193,458

[22] Filed: Oct. 3, 1980

[30] Foreign Application Priority Data

| Oct. 8, 1979 | [JP] | Japan | 54-129646 |
| Oct. 8, 1979 | [JP] | Japan | 54-129647 |
| Oct. 8, 1979 | [JP] | Japan | 54-129650 |
| Oct. 8, 1979 | [JP] | Japan | 54-129652 |
| Oct. 8, 1979 | [JP] | Japan | 54-129655 |

[51] Int. Cl.³ .................. H02M 3/335; H05B 41/32
[52] U.S. Cl. .................. 363/18; 315/241 P
[58] Field of Search ........ 315/209 T, 209 CD, 241 P; 363/18-20

[56] References Cited

U.S. PATENT DOCUMENTS

| 3,898,514 | 8/1975 | Takahashi | 315/241 P X |
| 4,130,780 | 12/1978 | Ban et al. | 315/241 P |
| 4,155,029 | 5/1979 | Yamaoka | 315/241 P X |
| 4,160,933 | 7/1979 | Tanaka | 315/241 P |
| 4,163,178 | 7/1979 | Hosono | 315/241 P |
| 4,251,753 | 2/1981 | Kondo | 315/241 P X |

*Primary Examiner*—William M. Shoop
*Attorney, Agent, or Firm*—Toren, McGeady & Stanger

[57] ABSTRACT

In a DC-DC converter for an electronic flash unit disclosed, an npn transistor is used as an oscillating transistor. The emitter of the npn transistor is connected to a main capacitor of the flash unit at least through a secondary winding of the converter. A diode is connected between the secondary winding and the main capacitor in such a manner that the emitter current of the npn transistor can flow into the main capacitor as an charging current through the secondary winding.

7 Claims, 10 Drawing Figures

DC-DC CONVERTER FOR ELECTRONIC FLASH UNIT

BACKGROUND OF THE INVENTION

1. Field of the Invention

This invention relates to a DC-DC converter for an electronic flash unit.

2. Description of the Prior Art

Generally, a DC-DC converter is used in an electronic flash unit for boosting the output voltage of a battery to obtain a high voltage flashing energy.

Heretofore, a DC-DC converter of this type has usually been formed with an oscillating transistor, an oscillating transformer, etc. A pnp germanium transistor having a low saturation voltage between the collector and the emitter thereof has been used as the above stated transistor for oscillation. However, germanium transistors are no longer manufactured in substantial quantities. Silicon transistors are now the principal type manufactured. As a result, germanium transistors have become expensive. Hence, there has arisen a strong demand for the use of an npn silicon transistor in place of a pnp germanium transistor. It is not difficult to meet this demand. A mere arrangement whereby a pnp germanium transistor is replaced with an npn silicon transistor would bring about a problem that the operator of the flash unit would tend to have an electric shock in replacing a battery of the flash unit. In the accompanying drawing FIG. 1, a DC-DC converter is shown which is arranged to merely have an oscillating pnp transistor replaced with an npn transistor. For example, when a finger of an operator touches a terminal 16 on the negative pole side of a battery case while another part of the body of the operator is in contact with the case C1 of a camera, an electric charge remaining in a main capacitor 13 is discharged through a winding 7b, the base and the emitter of a transistor 5, a terminal 1a of the battery, the above stated part of the body (which is not shown), the camera case C1, a hot shoe SH and an earth line EL. Thus, with such a simple arrangement, an accident of having an electric shock tends to happen.

SUMMARY OF THE INVENTION

It is an object of the invention to provide a DC-DC converter for a flash unit which is not only free from the fear of providing an electric shock on the above stated occasion but also permits the use of an npn silicon transistor as the oscillating transistor.

It is another object of the invention to provide a DC-DC converter for a flash unit in which a main capacitor of the flash unit can be efficiently charged.

These and further objects, features and advantages of the invention will become apparent from the following detailed description of embodiments thereof taken in connection with the accompanying drawings.

DESCRIPTION OF THE PREFERRED EMBODIMENTS

Figure 1:
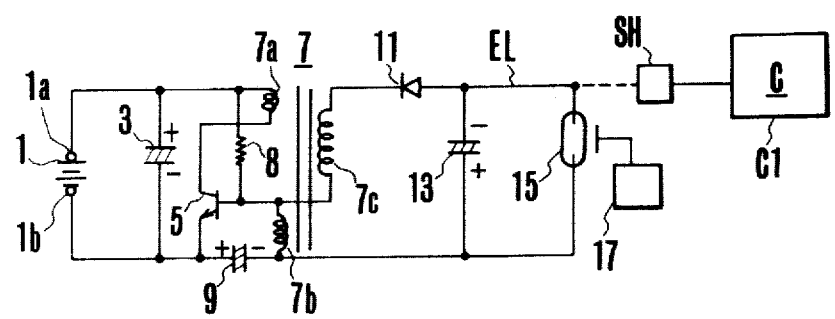
FIG. 1 is a circuit diagram showing an example of a flash unit having a DC-DC converter.
Figure 2:
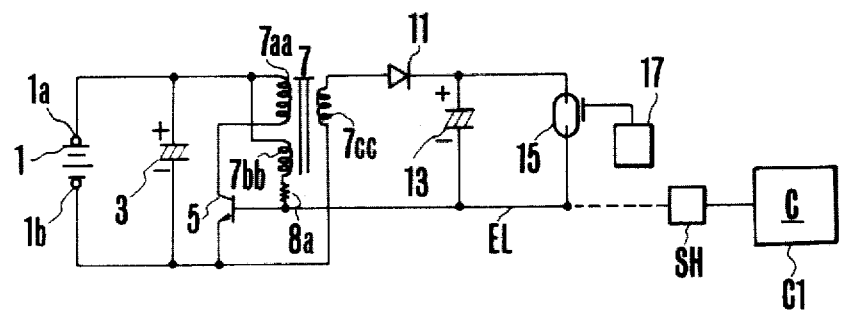
FIG. 2 is a circuit diagram showing a flash unit to which the present invention is applied as an embodiment thereof.

FIG. 2 is a circuit diagram showing the essential parts of a flash unit to which the present invention is applied. This flash unit comprises a power source battery 1, which includes a terminal 1a on the positive pole side of a battery case and a terminal 1b on the negative pole side thereof; a capacitor 3 which is provided for forming a DC-DC converter and is connected in parallel between these terminals; and an npn silicon transistor 5 for oscillation. The oscillating transistor 5 is connected in parallel with the terminals 1a and 1b of the battery case through a primary winding 7aa of a transformer for oscillation. The base of the transistor 5 is connected to the above stated terminal 1a through a resistor 8a and a feedback winding 7bb of the above stated oscillating transformer 7 and is also connected to the negative pole side of a main capacitor 13. One end of a secondary winding 7cc of the above stated oscillating transformer 7 is connected to the emitter of the above stated transistor 5. The other end of the secondary winding 7cc is connected to the positive pole side of the main capacitor 13 through a rectifying diode 11 and to the anode of a discharge tube 15. There is provided a known trigger circuit which has the output terminal thereof connected to a trigger electrode of the above stated discharge tube 15. An earth line EL is connected to the negative pole side of the main capacitor 13. It goes without saying that, when the flash unit is mounted on a camera, the earth line E1 is connected through a hot shoe SH to a camera case C1 which forms a part of the earth line of the camera in the same manner as in the case of FIG. 1. The flash unit which is arranged as described in the foregoing operates in the following manner:

When a power source switch is closed so as to have a base current flow from the battery 1 to the base of the transistor 5 through the feedback winding 7bb of the transformer 7 and the resistor 8a, a collector current corresponding to this base current also flows to the collector of the transistor 5 through the primary winding 7aa of the transformer 7. This causes an electromotive force induced at the secondary winding 7cc of the transformer 7 through a known process. Then, a charging current which is based on the induced electromotive force flows to the main capacitor 13 through the secondary winding 7cc, diode 11, the base of the transistor 5 and the emitter of the transistor 5 to charge the main capacitor in the polarity shown in the drawing. Concurrently, the induced electromotive force generated at the secondary winding 7cc of the transformer causes induced electromotive forces to be generated at the primary windings 7aa and 7bb of the transformer. The base current of the transistor 5 is further increased by this. The collector current thereof also further increases. With the processes described in the foregoing having been repeated, when the magnetic core of the transformer is saturated, there no longer takes place any interaction between the windings of the transformer 7. Then, the base current of the transistor 5 rapidly decreases to bring the transistor 5 back to a non-conductive state in a short period of time. With the transistor 5 having been brought back to its initial state in this manner, the above stated operation of the transistor 5 which followed the closing of the power source switch (not shown) is repeated to have the collector current thereof rapidly increase. Then, the magnetic core of the transistor 7 is again magnetized toward its saturated state. With the transistor 5 and the transformer 7 repeating their operations as stated in the foregoing, the main capacitor 13 is continuously charged to have the terminal voltage thereof keep on increasing.

In a flash unit which is arranged in this manner, when a finger of an operator touches the terminal 1b on the negative pole side of the battery case in an attempt to take out the battery 1 from the battery case, the flash unit operate as follows:

When a part of the operator is in contact with the case C1 of the camera while one of his fingers comes to touch the terminal 1b, the diode 11 and the discharge tube 15 which is in a high impedance state prevent the residual charge of the main capacitor 13 from being discharged to insure that almost no discharge current flows from the main capacitor 13 through the operator which is not shown. In accordance with the present invention, therefore, there takes place no accident of having an electric shock even in such a case.

Figure 3:
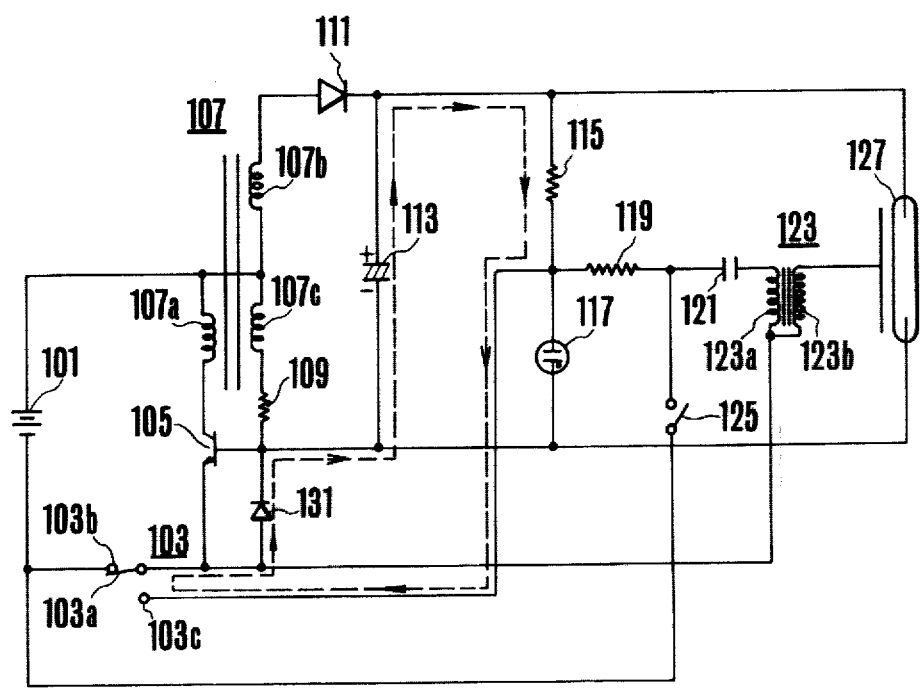
FIG. 3 is a circuit diagram showing a flash unit as a second embodiment of the present invention.

In a second embodiment of the invention shown in FIG. 3 as applied to a flash unit, there are provided a power source battery 101; and a power source switch 103 which is connected to a power supply route for a DC-DC converter which will be described hereinafter. The power source switch 103 is provided with a moving contact piece 103a and fixed contact pieces 103b and 103c. The DC-DC converter includes an npn transistor 105 which has the collector thereof connected to the positive electrode side of the battery 101 through a primary winding 107a of a transformer 107 which is also an element of the DC-DC converter. The emitter of the transistor 105 is connected to the negative side of the battery 101 through the moving contact piece 103a of the power source switch 103. Between a feedback winding 107c of the transformer 107 and the base of the transistor 105, there is connected a base resistor 109. A rectifying diode 111 is connected to a secondary winding 107b of the transformer 107. There are provided a known main capacitor 113; resistors 115 and 119 which form a charging route for a trigger capacitor 121; a known neon tube which detects the charging voltage of the main capacitor 113 and lights up when the voltage reaches a preset value; a known trigger transformer 123 which has a connecting point between the primary and secondary windings 123a and 123b connected to the battery 101 through the above stated power source switch 103; a known synchronizing contact 125 which has one end thereof connected to the negative electrode side of the battery 101; a known discharge tube 127 which has a trigger electrode thereof connected to the secondary winding 123b of the above stated trigger transformer 123; and a diode 131 which forms a by-pass route of the transistor 105 and has the anode thereof connected to the emitter of the above stated transistor 105. The flash unit which is arranged as described in the foregoing operates in the following manner:

In using the flash unit, when the power source switch 103 is closed as shown in FIG. 3, a base current flows to the base of the npn transistor 105 through the feedback winding 107c, the resistor 109, the base of the npn transistor 105, the emitter of the transistor 105 and the power source switch 103. The flow of the base current to the base of the transistor 105 causes a collector current to flow to the collector of the transistor 105 through the primary winding 107a. This in turn generates an induced electromotive force at the secondary winding 107b of the transformer 107. The induced electromotive force then produces a current which charges the main capacitor 113 into the polarity as shown in FIG. 3 by flowing through the diode 111, the main capacitor 113, the resistor 109 and the feedback winding 107c. Meanwhile, there is formed a closed circuit which consists of the switch 103, the battery 101, the secondary winding 107b of the transformer 107, the diode 111, the main capacitor 113 and the base and the emitter of the transistor 105. Therefore, the main capacitor 113 is charged into the polarity shown in FIG. 3 also by a current which flows through this closed circuit. When the current based on the induced electromotive force flows to the secondary winding 107b as mentioned in the foregoing, there are also produced induced electromotive forces at the first winding 107a and the feedback winding 107c of the transformer 107. This causes the current which flows to the collector of the oscillating transistor 105 to rapidly increase and the magnetic core of the transformer 107 begins to rapidly saturate. With the magnetic core of the transformer 107 having saturated, there no longer takes place any interaction between the windings of the transformer 107 and then the base current of the transistor 105 comes to rapidly decrease to bring the transistor 105 back into a non-conductive state. With the transistor 105 thus brought back to its initial state, the transistor 105 repeats the above stated operation thereof which follows the closing of the power source switch. The collector current of the transistor 105 then rapidly increases. Meanwhile, the magnetic core of the transformer 107 is again magnetized toward its state of saturation. With the above stated operation of the transistor 105 and the transformer 107 repeated, i.e. by the oscillating action of the DC-DC converter, the main capacitor 113 is continuously charged to the polarity as shown in the drawing and the terminal voltage thereof continues to rise. When the charge voltage of the main capacitor 113 reaches a voltage value that enables the discharge tube to flash, the neon tube 117 comes to light up indicating that preparation for flashing is completed and also thus informs the operator that the flash unit is in use.

Following this, when the synchronizing contact 125 is closed, an electric charge accumulated at the trigger capacitor 121 is discharged through the synchronizing contact 125, the power source switch 103, and the primary winding 123a of the trigger transformer 123. This causes a trigger pulse to be produced at the secondary winding 123b of the transformer 123. Then, an electric charge accumulated at the main capacitor 113 is discharged through the discharge tube 127 to effect flashing.

When the flash unit is not in use, if, for example, the camera is switched into a daylight photographing mode, the power source switch 103 is opened. Then, the moving contact piece 103a is shifted to the fixed contact 103c and the anode of the neon tube 117 is grounded. The neon tube 117 is immediately extinguished to indicate that the flash unit is no longer in use. Further, the residual charge of the main capacitor 113 is arranged to be discharged through a discharge route as indicated by a broken line in FIG. 3, that is the residual charge is discharged through the resistor 115, the fixed and moving contacts 103c and 103a of the power switch 103 and the diode 131.

Meanwhile, the above stated discharge from the capacitor 113 produces a forward voltage at both ends of the diode 131. However, as well known, this voltage is very low. Therefore, the transistor 105 is never destroyed by this voltage.

In accordance with this embodiment of the invention, the main capacitor 113 is arranged to be charged into the polarity as shown in FIG. 3, so that the same effect as in the first embodiment mentioned in the foregoing can be obtained. In addition to that, the non-use of the flash unit is clearly displayed by the neon tube. Besides, in making this display, a voltage between the base and the emitter of the transistor 105 is suppressed to a low level by the diode 131 to protect the transistor 105 from being destroyed during this display process.

Figure 4:
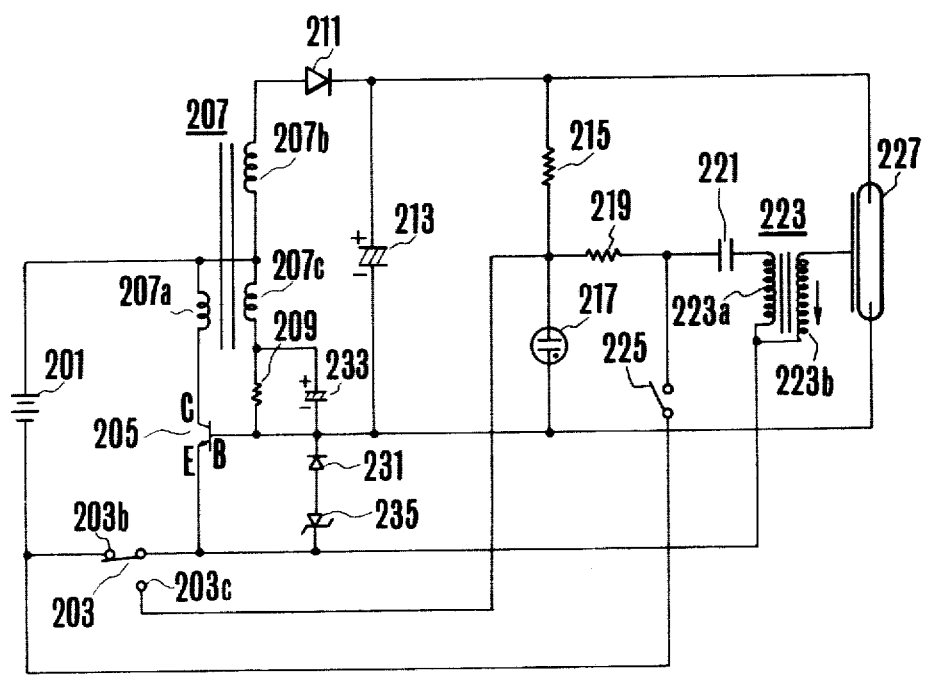
FIG. 4 is a circuit diagram showing a flash unit as a third embodiment of the invention.

A third embodiment of the invention is as shown in FIG. 4 which is a circuit diagram of a flash unit incorporating the third embodiment. There are provided a power source battery 201; a power source switch 203; and an npn transistor 205. The transistor 205 is arranged to act as oscillating transistor. An oscillating transformer 207 has the primary coil 207a thereof connected to the collector of the above stated transistor 205. The oscillating transformer 207 is also provided with secondary coils 207b and 207c. The coil 207b has one end thereof connected to the power source battery 201 while the other end thereof is connected to a main capacitor 213 through a rectifying diode 211. The coil 207c has one end thereof connected to the power source battery 201 while the other end thereof is connected to the base of the above stated transistor 205 through a resistor 209. A capacitor 233 is connected to this resistor 209 in parallel therewith. The transformer 207, the transistor 205, the resistor 209 and the capacitor 233 jointly form a DC-DC converter. A diode 231 is connected in series with a Zener diode 235. These series connected diode 231 and the Zener diode 235 are connected between the base and the emitter of the above stated transistor 205. There are provided a resistor 215 and a neon tube 217 which is connected in series with the resistor 215. The series circuit formed by the resistor 215 and the neon tube 217 is connected in parallel with the main capacitor 213. A resistor 219 forms a discharge route for the electric charge of a trigger capacitor 221 when the moving contact piece of the power source switch 203 is connected to the contact 203c of the switch. A trigger capacitor 221 forms a trigger circuit for a flashing tube 227 jointly with a trigger coil 223. A reference numeral 225 indicates an X contact (a synchronizing switch). The flash unit to which the present invention is applied as shown in FIG. 4 operates in the following manner:

When the moving contact piece of the power source switch 203 is connected to the contact 203b thereof, a base current flows to the base of the transistor 205 through the coil 207c and the capacitor 233. Then, a current which is $h_{fe}$ times as much as the base current flows to the collector of the transistor 205. Then, through the action of the transformer 207, a current flowing to the coil 207b increases while the collector current of the transistor 205 also increases. In other words, the transistor 205 is turned on by a positive feedback action. After that, when the magnetic core of the transformer 207 becomes saturated, the above stated positive feedback action is completed. Then, conversely, positive feedback is performed in the direction of decreasing the collector current and the base current to turn off the transistor 205. After the transistor 205 is turned off in this manner, the above stated processes of operation are repeated to oscillate the transistor 205 by turning it on and off in a repeating manner. During the process of the oscillating action of the transistor 205, the main capacitor 213 is charged in the polarity as shown in FIG. 4 by a current which flows through a closed circuit formed by the battery 201, the coil 207b, the diode 211, the main capacitor 213, the base and the emitter of the transistor 205 and the power source switch 203. When the transistor 205 shifts from its on state to its off state during the process of the above stated oscillation, there is generated a counter electromotive force at the coil 207c. Assuming that there is provided no Zener diode 235, the diode 231 would be forward biased by this counter electromotive force to have the capacitor 233 charged in the reverse direction. However, as shown in FIG. 4, the diode 231 has the Zener diode 235 connected in series therewith and then, with the Zener voltage thus obtained arranged to be higher than a reverse bias voltage impressed between the base and the emitter of the transistor 205, the diode 231 is kept in a non-conductive state, so that the capacitor 233 is never charged in the reverse direction.

Further, upon completion of charging of the main capacitor 213 through the above stated processes of operation, the neon tube is turned on to display the completion of the charging operation. After that, when a shutter button of the camera which is not shown is depressed, the synchronizing switch 225 is turned on. The electric charge at the capacitor 221 is discharged. The transistor 223 acts to trigger the flash tube 227 to have a flash light fired therefrom. During this triggering action, a current flows to the secondary coil of the transformer 223 in the direction of an arrow indicated in FIG. 4. Since this current flows through the Zener diode 235 and the diode 231, the reverse voltage which is impressed on the base and the emitter of the transistor 205 is restricted to the Zener voltage plus the forward voltage of the diode 231, so that the transistor 205 can be kept unaffected by the reverse voltage. Further, when the power source switch 203 is shifted from the contact 203b to another contact 203c, the neon tube 217 is short circuited and extinguished. Meanwhile, the electric charge at the main capacitor 213 is discharged through the resistor 215, the switch 203, the Zener diode 235 and the diode 231, so that the voltage of the main capacitor 213 can be prevented from being impressed on the transistor 205.

As described in detail in the foregoing, the flash unit to which the embodiment of the invention is applied has the same advantage as the first embodiment. Further, since an npn transistor is employed as an oscillating transistor in the charging circuit of the flash unit and the series circuit consisting of the Zener diode and the diode is connected in parallel with the base and emitter of the transistor, when the power source switch is off, the oscillating transistor can be prevented from being affected by the discharge current of the main capacitor. This arrangement also prevents the power from being wasted by charging and discharging operations on the capacitor 233.

Figure 5:
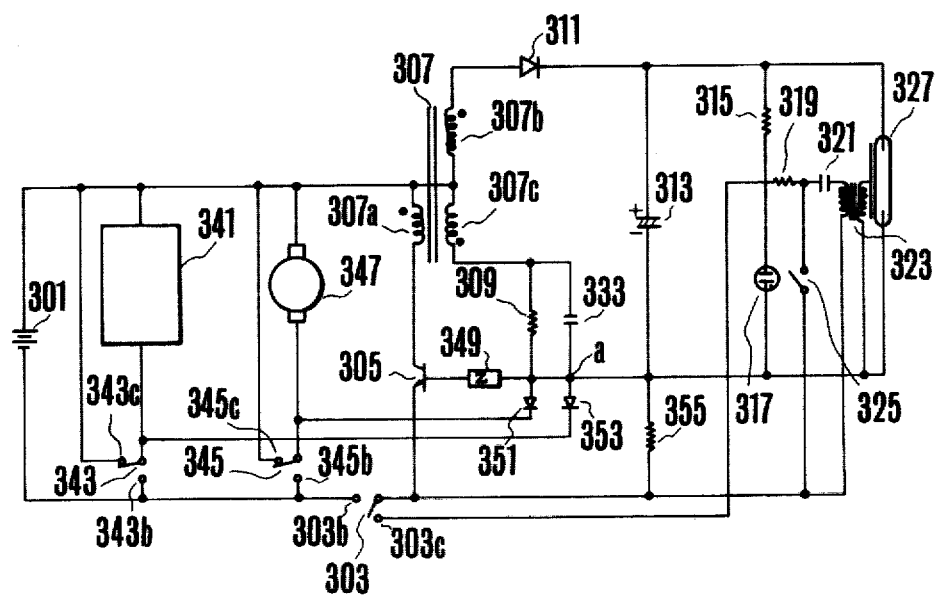
FIG. 5 is a circuit diagram showing a flash unit as a fourth embodiment of the invention.
Figure 6A:
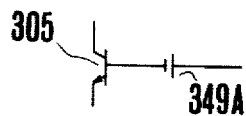
FIGS. 6(a)–(d) are circuit diagrams showing examples of a circuit element 349 shown in FIG. 5 and the connection thereof to a transistor 305.
Figure 6B:
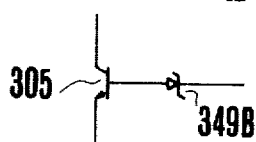
Figure 6C:
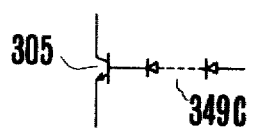
Figure 6D:
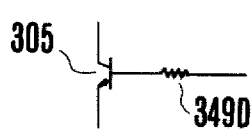

A fourth embodiment of the invention is as shown in FIG. 5 which is a circuit diagram showing a camera to which the embodiment of the invention is applied. In this camera, there are provided a power source battery 301; a photographing control circuit 341 including a light measuring circuit, a shutter control circuit, an automatic focus detection control circuit, etc.; a power supply switch 343 having a moving contact piece which is arranged to be connected to a fixed contact 343c in response to an operation on a release member (which is not shown) and to be connected to another fixed contact 343b in response to completion of shutter control; a motor 347 which is arranged to perform shutter charging and film winding actions; another power supply switch having a moving contact piece which is arranged to be connected to a contact 345b of the switch upon completion of a shutter control action by the control circuit 341 and to be connected to another contact 345c upon completion of the shutter charging and film winding actions; an oscillating transformer 307; an oscillating transistor 305; a resistor 309; and a capacitor 333. A DC-DC converter is formed jointly by the transformer, the transistor, the resistor and the capacitor. A diode 351 is connected between the base of the transistor 305 and the moving contact piece of the switch 345 through a circuit element 349. When the moving contact piece of the switch 345 is in connection with the contact 345c of the switch, this diode 351 prevents the voltage of the power source battery 301 from being impressed on the transistor 305 and thus serves as separating diode. Another diode 353 is connected between the base of the transistor 305 and the moving contact piece of the switch 343 through the above stated circuit element 349. This diode is also arranged to act as separating diode in the same manner as the other diode 351. The above stated circuit element 349 which is disposed between the base of the transistor 305 and the anodes of the diodes 351 and 353 is provided for the purpose of apparently raising a voltage $V_{BE}$ between the base and the emitter of the transistor 305. The reason for the provision of the circuit element 349 is such that, while the switches 345 and 343 are turned on, when the sum Dv+Rv of a forward voltage Dv obtained from the diodes 351 and 353 and a voltage drop Rv caused by contact resistance given at both ends of the switches 343 and 345 as they are closed becomes greater than the voltage $V_{BE}$ between the base and the emitter of the transistor 305, the transistor 305 is kept in its off state without fail by the circuit element 349. Referring to FIGS. 6(a)-(d), a battery 349A, a Zener diode 349B, a diode 349C or a resistor 349D is used as the above stated circuit element 349 as shown in FIG. 5. Further, in FIG. 5, a reference numeral 311 indicates a rectifying diode; 313 indicates a main capacitor; 315, 319, 355 indicate resistors; 317 indicates a neon tube; 321 indicates a trigger capacitor; 323 indicates a trigger transformer; 325 indicates a synchronizing switch; 327 indicates a discharge tube; and 303 indicates a main switch of the flash unit. The fourth embodiment of the invention shown in FIG. 5 operates in the following manner:

First, when the moving contact piece of the switch 303 is connected to the contact 303b of the switch, a current flows from the power source 301 to the base of the transistor 305 through the coil 307c of the transformer 307, the capacitor 333 and the circuit element 349. The DC-DC converter is rendered operative by this. The transistor 305 performs an oscillating operation by repeating the on and off actions thereof. The main capacitor 313 is charged into the polarity as shown in FIG. 5. Meanwhile, since the switches 345 and 343 are connected to the contacts 345c and 343c respectively to have the power from the power source used for the sole purpose of charging the flash unit, the main capacitor 313 is rapidly charged. Upon completion of the charging operation on the main capacitor 313, the neon tube comes to light up to display completion of preparation for flashing. After that, when a release member which is not shown is operated, the moving contact piece of the switch 343 is connected to the contact 343b of the switch to effect a power supply to the control circuit 341. On the other hand, the closing of the switch 343 lowers potential at a point a to turn off the oscillating transistor 305 and power supply to the flash unit discontinues. Meanwhile, with the power supplied to the control circuit 341, the light measuring circuit, the automatic focus detecting control circuit and the shutter control circuit are rendered operative to perform the light measuring, focusing and shutter controlling actions. The shutter control action then turns the synchronizing switch 325 on. The electric charge at the capacitor 321 is discharged to trigger the flashing tube 327. Then, the electric charge at the main capacitor 313 is discharged through the flashing tube 327 to fire a flash light and thereby to carry out a flash photographing operation. Upon completion of the flash photographing operation, the moving contact piece of the switch 343 is connected to the other contact 343c of the switch to stop the power supply to the control circuit 341. Meanwhile, the moving contact piece of the switch 345 is connected to the contact 345b of the switch to begin power supply to the motor 347. The motor 347 is rendered operative by this to perform the shutter charging and film winding actions in preparation for a next photographing operation. Further, during the operation of the motor 347, the moving contact piece of the switch 345 is connected to the contact 345b of the switch, the potential at the point a stays in the lowered state to keep the transistor 305 off. Therefore, power supply to the flash unit is not effected. The power of the power source 301 is used solely for the operation of the motor, so that the shutter charging and film winding actions can be promptly carried out. Upon completion of preparation for a next photographing operation with the shutter charging and film winding actions having been carried out, the moving contact piece of the switch 345 is connected to the contact 345c of the switch to cut off the power supply to the motor 347. Further, with the moving contact piece of the switch 345 connected to the contact 345c, since the moving contact piece of the other switch 343 is also in connection with the contact 343c as stated in the foregoing, the potential at the point a rises to cause the base current to flow to the transistor 305 to make the transistor 305 operative. Then, again the DC-DC converter will operate to begin a charging action on the main capacitor 313. Since the control circuit 341 and the motor 347 are in response with the power no longer supplied thereto at this point of time, the power available from the power source 301 is used for the sole purpose of charging the flash unit, so that charging can be promptly accomplished. In accordance with this embodiment of the invention, it is not only possible to obtain the same advantage as in the first embodiment but also possible to have power supplied to the motor and to the flash unit in a time seriated manner with a minimum mechanical switching arrangement. The shutter charging and film winding actions and the flash unit charging action thus can be promptly accomplished. In other words, the switch 345 for power supply to the motor 347 is utilized as switch for short-circuiting between the base and the emitter of the transistor 305, so that power supply to the motor and to the flash unit can be time serially effected by simple arrangement. Further, the provision of the above stated circuit element 349 ensures an accurate operation.

During power supply to the motor 347, assuming that the voltage drop at the switch 345 is Rv and the forward voltage drop at the diode 351 is Dv, the potential at the point a becomes Rv+Dv. Then, if the circuit element 349 is not provided there, it is possible that the oscillating operation of the flash unit might continue even while the power is supplied to the motor when the above stated voltage value Rv+Dv is higher than the voltage $V_{BE}$ between the base and the emitter of the transistor 305. Whereas, the provision of the circuit element 349 in accordance with this embodiment example turns off the transistor 305 without fail during power supply to the motor 347 because the voltage $V_{BE}$ of the transistor 305 is caused to be apparently higher by the provision of the circuit element 349. Accordingly, the time seriated power supply can be always accurately performed.

Figure 7:
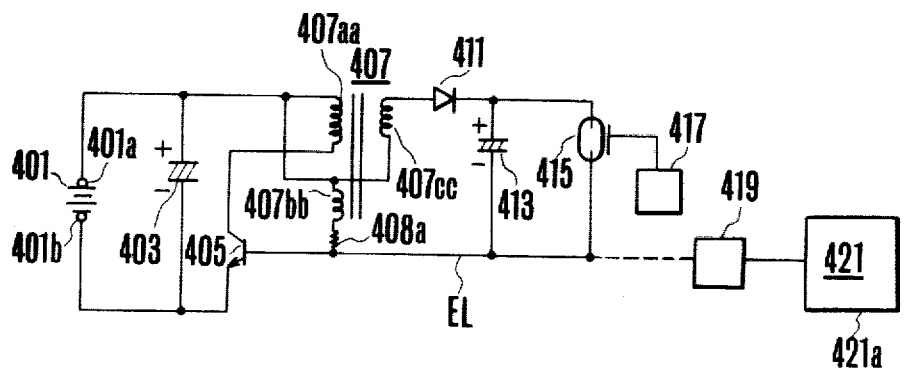
FIG. 7 is a circuit diagram showing a flash unit as a fifth embodiment of the present invention.

FIG. 7 is a circuit diagram showing a flash unit to which the present invention is applied as a fifth embodiment thereof. The flash unit comprises a power source battery 401; a terminal 401a on the positive side of a battery case; a terminal 401b on the negative side of the battery case; a capacitor 403 which forms a DC-DC converter is connected in parallel between these terminals 401a and 401b; and an oscillating npn silicon transistor 405 which is connected in parallel between the terminals 401a and 401b of the battery case through a primary winding 407aa of an oscillating transformer 407. The base of the transistor 405 is connected to the above stated terminal 401a of the battery case through a resistor 408a and a feedback winding 407b of the oscillating transformer 407. The base of the transistor 405 is also connected to the negative electrode side of a main capacitor 413. One end of a secondary winding 407cc of the above stated oscillating transformer 407 is connected to the above stated terminal 401a while the other end of the secondary winding 407cc is connected to the positive electrode side of the above stated main capacitor 413 and to the anode of a discharge tube 415 through a rectifying diode 411. There is provided a known trigger circuit 417. The output terminal of the trigger circuit 417 is connected to a trigger electrode of the above stated discharge tube 415. An earth line EL is connected to the negative electrode side of the main capacitor 413. When the flash unit is mounted on a camera 421, the earth line EL is of course connected through a hot shoe 419 of the camera 421 to a camera case 421a which forms a part of an earth line arranged on the side of the camera in the same manner as in the flash unit shown in FIG. 1. The flash unit which is arranged as described in the foregoing operate in the following manner:

With a power source switch which is not shown made, when a base current flows from the battery 401 to the base of the transistor 405 through the feedback winding 407bb of the transformer 407 and the resistor 408a, a collector current which corresponds to the base current flows to the collector of the transistor 405 through the primary winding 407aa of the transformer 407. By this, an electromotive force is induced through a known process at the secondary winding 407cc of the transformer 407. Then, the main capacitor 413 is charged in the polarity as shown in the drawing by the induced electromotive force and the output of the battery 401 through the secondary winding 407cc, the diode 411, the main capacitor 413, and the base and the emitter of the transistor 405. At this point of time, the base of the transistor 405 has a current corresponding to the above stated electromotive force induced at the secondary winding 407cc flow thereto. Therefore, the base current and the collector current of the transistor 405 increase. Meanwhile, concurrently with this, the induced electromotive force generated at the secondary winding 407cc of the transformer 407 causes induced electromotive forces to be also generated at the primary windings 407aa and 407bb of the transformer 407. The base current of the transistor 405, therefore, is further increased by this and the collector current of the transistor 405 is also further increased. With these processes repeated, when the magnetic core of the transformer 407 saturates, there no longer takes place any interaction between the windings of the transformer 407. The base current of the transistor 405, therefore, now rapidly decreases to bring the transistor 405 back into a non-conductive state in a short period of time. With the transistor 405 coming back to its initial state in this manner, the transistor this time repeat the processes of operation which have followed the making of the power source switch (not shown). Then, the collector current of the transistor 405 rapidly increases to have the magnetic core of the transformer magnetized again toward its saturated state. The main capacitor 413 continues to be charged as the above stated processes of the transistor 405 and the transformer 407 are repeated, i.e. by the oscillating action of the DC-DC converter. The terminal voltage of the main capacitor 413 then continues to rise.

In the flash unit which is arranged in this manner, when a finger of an operator happens to touch the terminal 401b on the negative pole side of the battery case in an attempt to take out the battery 401 from the battery case, the flash unit operates in the following manner:

In the case where another part of the body of the operator is in contact with the camera case 421a when the finger or the like of the operator comes to touch the terminal 401b, the electric charge remaining at the main capacitor 413 is prevented from being discharged by the diode 411 and the discharge tube 415 which is in a state of high impedance. Therefore, there flows almost no discharge currrent from the main capacitor 413 through the operator which is not shown and there never takes place any accident of having an electric shock.

Since the main capacitor is arranged as shown in the drawing, the present invention not only prevents an accident of having an electric shock but also permits the use of an inexpensive npn silicon transistor as an oscillating transistor.

What is claimed is:

1. A DC-DC converter for an electronic flash unit having a main capacitor, said DC-DC converter comprising:
    (a) an oscillating transformer having a primary winding, a secondary winding and a feedback winding;
    (b) an npn oscillating transistor having an emitter connected to one electrode of said main capacitor through the secondary winding of said transformer, said transistor being arranged to apply a current for charging the main capacitor therewith; and
    (c) rectifying means which is arranged in a forward direction for said charging current and is connected between said one electrode of the main capacitor and the secondary winding of said transformer.

2. A DC-DC converter according to claim 1, wherein said npn oscillating transistor includes a base connected to the other electrode of said main capacitor.

3. A DC-DC converter according to claim 2, wherein said npn oscillating transistor includes a collector connected to the primary winding of said transformer.

4. A DC-DC converter according to claim 3, further comprising:
a battery connected to the base of said npn oscillating transistor through the feedback winding of said transformer for applying a base current to the base of said transistor.

5. A DC-DC converter according to claim 4, wherein said rectifying means includes a diode having an anode thereof connected to the secondary winding of said transformer.

6. A DC-DC converter according to claim 5, wherein said battery includes a positive electrode connected to the anode of said diode through the secondary winding of said transformer.

7. A DC-DC converter according to claim 2, further comprising:
a diode having an anode thereof connected to the emitter of said transistor and a cathode thereof connected to the base of said transistor.

* * * * *